United States Patent [19]

Terry et al.

[11] 4,295,573
[45] Oct. 20, 1981

[54] METHOD OF OBTAINING A SEAL UPON THE INTERIOR SURFACE OF A CONTAINER CLOSURE AND RESULTING PRODUCT

[75] Inventors: Robert R. Terry, Dunwoody, Ga.; Jacob J. Boone, Vermilion, Ohio

[73] Assignee: Nordson Corporation, Amherst, Ohio

[21] Appl. No.: 101,502

[22] Filed: Dec. 21, 1979

[51] Int. Cl.³ .................. B65D 53/06; B32B 5/18; B05B 7/16
[52] U.S. Cl. .................. 215/348; 156/78; 156/578; 427/284; 427/422; 428/66; 428/157; 428/159; 428/195; 428/313; 118/302
[58] Field of Search .................. 156/78, 79, 578; 215/348; 427/422, 284; 428/66, 157, 158, 159, 195, 313; 118/302

[56] References Cited

U.S. PATENT DOCUMENTS

| | | | |
|---|---|---|---|
| 3,053,221 | 9/1962 | Heffley et al. | 118/318 X |
| 3,261,895 | 7/1966 | Strickman | 215/348 X |
| 3,570,725 | 3/1971 | Baker et al. | 118/315 X |
| 3,788,561 | 1/1974 | Vilagi et al. | 264/129 X |
| 3,859,113 | 1/1975 | Horvath et al. | 118/316 X |
| 4,059,714 | 11/1977 | Scholl et al. | 156/78 X |
| 4,156,754 | 5/1979 | Cobbs et al. | 156/78 X |

Primary Examiner—Robert A. Dawson
Attorney, Agent, or Firm—Wood, Herron & Evans

[57] ABSTRACT

A method for emplacing a seal on a closure for a container which comprises despositing a foamed adhesive in liquid form on an interior surface of the closure and allowing that foamed adhesive to solidify and adhere as a solid cellular foam to the interior surface of the closure.

2 Claims, 2 Drawing Figures

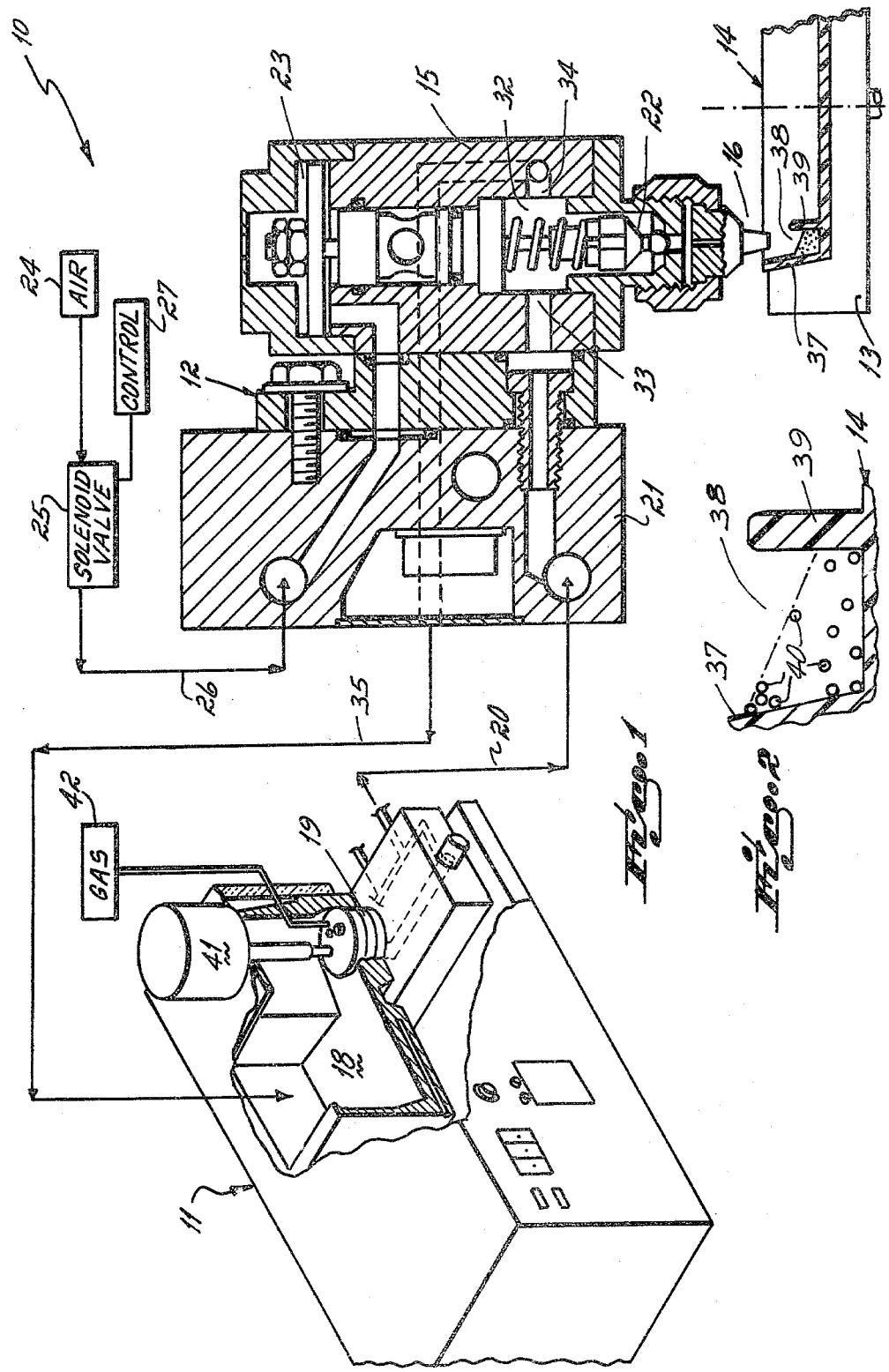

METHOD OF OBTAINING A SEAL UPON THE INTERIOR SURFACE OF A CONTAINER CLOSURE AND RESULTING PRODUCT

This invention relates to the sealing of closures for containers and particularly to a new method for emplacing seals thereon and to a new material for forming such seals.

The seals with which this invention are concerned may take either of two forms. According to one form a gasket is formed to prevent leakage of fluid at the juncture between the closure and the container. In the other, a barrier is created to prevent leakage of fluids through the seal material. An example of the first form is that type which extends around the inside of the top of a screw on lid or a clamp on bottom cap. An example of the second form of seal is that used on the underside of a can end having a pull tab or other opening associated therewith, in which case the seal is emplaced on the inner surface of the can end to cover any joint or seam.

In the application of such seals to container closures under high speed production conditions, the industry has generally applied the seals in any one of three different ways. One way involved rotating a cap or can end relative to a stationary applicator device. This technique is exemplified by the disclosure of U.S. Pat. Nos. 3,053,221 and 3,859,113. Another way involved moving an applicator relative to a stationary cap or can end, and the third technique involved ejecting a predetermined pattern of seal material onto a stationary closure for a stationary applicator. This third technique is described in U.S. Pat. No. 3,788,561.

Irrespective of which of the three techniques was employed, the seal or gasket material is flowed onto the closure as a liquid and thereafter permitted to harden and form the gasket material. One common material used for this purpose is a material called "Plastisol". It comprises the combination of a liquid plasticizer and a resin which does not dissolve in the plasticizer at normal room temperatures. This permits the "Plastisol" to be applied to the closure as a viscous liquid at room temperature. When heat is thereafter applied the resin is dissolved in the plasticizer and the "Plastisol" hardens into a rubber like state. Another common material applied for this purpose is a thermoplastic hot melt compound which is generally applied at 350° F. When cooled to room temperature this liquid hot melt compound sets up to form a resilient seal on the closure. Another type of sealant material which may be applied as a liquid and when cured forms a solid gasket material, is a water base latex gasket material which is applied at ambient or room temperature. All of these different types of sealant materials are commonly applied as a liquid by an extrusion process and subsequently cured to form the seal or gasket.

The primary reason for utilizing the three different types of sealant materials described hereinabove is that they may all be applied as a liquid on high speed production equipment and then cured to form the ultimate gasket or seal on the closure. Oftentimes though the resulting seal or gasket is not as resilient as is desired and therefore does not effect as good a seal as may be necessary for a particular application. In other applications the cost of the sealant material is objectionable.

It has therefore been an objective of this invention to provide a seal or gasket which may be extruded as a liquid onto closure surfaces and cured thereon, but which is less expensive than the common sealing materials now utilized for that purpose.

Another objective of this invention has been to provide a sealant material which may be applied as a liquid extrusion onto the closure and cured thereon to form the seal which is more resilient than materials heretofore employed for this purpose.

These objectives are accomplished and this invention is predicated upon the concept of emplacing a liquid adhesive as a foam onto the container closure surface and thereafter permitting that liquid foam to solidify and set up as a cellular solid foam seal or gasket adhered to the closure. This seal has greater resiliency than a seal made of the same material in an unfoamed condition and requires less adhesive material than an unfoamed seal made from the same material.

Other objectives and advantage of this invention will be more apparent from the following description of the drawings in which:

FIG. 1 is a schematic drawing of a system utilized to apply seals to closures according to the practice of this invention.

FIG. 2 is an enlarged cross-sectional view of a portion of the bottle cap illustrated in FIG. 1.

Referring to FIG. 1 there is illustrated a system for practicing the method of this invention and for achieving the novel product derived from the practice of this method. Specifically, this system 10 comprises a hot melt thermoplastic foam generator 11 for supplying hot melt foam to a combination manifold block dispenser and applicator 12. The applicator is operable to dispense the liquid foam adhesive into an annular groove or channel 38 on the interior surface of a bottle cap 14 while that cap 14 is supported and rotated by a motor driven chuck 13. The motor driven chuck 13 may be a part of an indexable turret or table operable to index bottle caps 14 into an applicator position beneath the nozzle 16 of the applicator 12, to rotate the bottle cap 14 when so located beneath the nozzle 16, and to index the cap after application to a take-off station.

The individual components of the system, including the hot melt adhesive generator 11, the combination manifold block and applicator 12, and the bottle cap chuck 13 are all well known in the prior art and are all the subject of issued patents. Specifically, a preferred hot melt adhesive generator 11 is the subject of U.S. Pat. No. 4,059,714. One suitable combination manifold block and applicator 12 is disclosed in U.S. Pat. No. 3,570,725, and a rotary bottle cap chuck 13 suitable for use in this application is fully disclosed in U.S. Pat. No. 3,053,221. It is only when the three components are combined as illustrated in FIG. 1 that any novelty is claimed for the system or method practiced by that system.

Since the individual components of the system are old and well known to the prior art, no attempt has been made to illustrate and describe the individual components. Details of these individual components of the system may be found in the disclosures of the above identified patents which are hereby incorporated by reference.

The hot melt foam adhesive generator 11 comprises a heated reservoir 18 within which solid thermoplastic adhesive material is either pellet, chunk, or block form is heated and melted. The liquid molten adhesive is then mixed with carbon dioxide, nitrogen, or air and pressurized by either a one step or two step gear pump 19. Within the gear pump, the gas and molten adhesive are thoroughly mixed and the gas is forced under pump outlet pressure, generally on the order of 300 pounds per square inch, into solution with the liquid adhesive. The liquid/gas solution is then supplied via heated conduit 20 to the manifold block 21 of the combination manifold block and applicator 12. Conduits within this manifold block transfer the liquid/gas adhesive solution to a valved type of adhesive applicator 15 from which the adhesive is dispensed at atmospheric pressure. Upon emergence from the outlet nozzle 15 the gas evolves from the solution in the form of small bubbles causing the adhesive to expand volumetrically. The resultant adhesive sets up as a homogeneous solid foam having closed gas cells evenly distributed throughout the adhesive.

The applicator 15 is a conventional pneumatic activated dispenser having a valve 22 controlled by a pneumatic motor 23 contained internally of the dispenser. Air at a pressure substantially above that of the atmosphere is flowed from an air pressure source 24 through a solenoid control valve 25 and a conduit 26 to the manifold block 21 and subsequently to the motor 23 of the dispenser. The solenoid valve 25 is controlled by any conventional control 27 which may be as simple as a push button switch or as complex as a timer controlled electrical circuit.

In the preferred embodiment, the applicator 15 is of the continuous flow type. That is, the liquid gas solution is continuously flowed through a central chamber 32 of the dispenser 15 via an inlet port 33 and an outlet port 34. From the outlet port 34, a conduit 35 flows the liquid/gas solution back to the reservoir 18 of the hot foam adhesive generator 11. This continuous flow of liquid adhesive/gas solution through the applicator insures that there is never any opportunity for gas to go out of solution or for the molten adhesive to set up and become hardened within the applicator 15.

In practice, solid hot melt adhesive in pellet, block or chunk form is inserted into the reservoir 18 where it is melted by heaters (not shown) located in the base of the reservoir. The molten adhesive then flows by gravity into the inlet of the gear pump 19. The pump 19 is driven from a pneumatic motor 41. The pump is also supplied with a gas such as carbon dioxide or nitrogen at the pump inlet. The pump is operative to thoroughly disperse the carbon dioxide or nitrogen gas into the molten adhesive and to force that gas into solution with the molten adhesive.

From the pump outlet the molten adhesive is flowed through a heated hose 20 to the heated manifold block 21 and subsequently to the applicator 15. The molten adhesive/gas solution is caused to flow continuously through the chamber 32 of the applicator back through the manifold block 21 and via the heated hose 35 to the reservoir 18. Thus, there is always a flow of molten adhesive/gas solution through the applicator irrespective of whether the valve 22 contained within the applicator is opened or closed.

When adhesive is to be applied to a lid or cap 14 supported upon the rotating chuck 13, the solenoid valve 25 is energized by the electrical control 27. In the preferred embodiment this control 27 is a conventional timer control circuit operative to open the solenoid valve 25 for a predetermined period of time. When the valve is opened, air from an air pressure source 24 is caused to flow through a conduit 26 and manifold block 21 to a pneumatic motor 23 contained internally of the applicator. Connection of the motor 23 to the air pressure source 24 causes the valve 22 of the applicator to be opened, thereby permitting high pressure molten adhesive/gas solution to flow from the chamber 32 of the applicator through the nozzle 16 into a recess 38 defined between the lid side wall 37 and an annular ridge 39 spaced inwardly from the side wall 37. As the molten adhesive/gas solution emerges from the nozzle 16 the gas comes out of the solution and expands to form a foam. The foam material partially climbs the outside wall 37 of the recess 38 as a consequence of centrifugal force generated by rotation of the cap. The molten adhesive foam adheres to the plastic bottle cap 14 as it cools and forms a solid adhesive closed cell 40 foam within the groove or recess 38. Thereafter, the bottle cap is removed from the chuck and a new cap inserted preparatory to dispensing of foamed adhesive into the groove of the next bottle cap.

When the bottle cap having the foamed adhesive material contained in the groove is applied to a glass bottle or jar or any conventional type of container, the foamed adhesive forms a gasket between the cap and the container. Because the material is foamed it is more resilient and forms a better seal than the same material placed in the recess 38 in an unfoamed state. Additionally, because the foamed material is more resilient than the same material in an unfoamed state, when utilized in threaded closures, enables the application torque to obtain a good seal between the closure and the container to be reduced, and as a consequence, enables the torque required for removal of that closure to be substantially reduced, often for as much as half the removal torque required if the same sealing material is used in an unfoamed state.

In one preferred practice of this invention, a foamed hot melt adhesive material was applied to the interior sealing surface 38 of a 2.06 inch diameter plastic jar lid. The particular hot melt adhesive material used in this application was a formulation No. 798-21-6 manufactured and sold by the H. B. Fuller Company. This is a commercially available type of adhesive. The conditions under which this formulation was applied were as follows:

| | |
|---|---|
| Application temperature | Tank = 350° F. |
| | Hose = 350° F. |
| | Applicator Gun = 350° F. |
| Actual temperature of material | 325° F. |
| Air pressure to solenoid | 60 psi |
| $CO_2$ gas pressure | 10 psi. |
| $N_2$ Blanket pressure | 2 psi. |
| Lid spin speed | 900 rpm. |
| Timer setting | 112 msec. |
| Applied in two rotations of lid. | |

The heated reservoir 18 was maintained at a tank temperature of 350° F. At this temperature the solid adhesive material was melted within the reservoir and maintained at an application temperature of approximately 325° F. The hoses 20–25 were heated to a temperature of 350° F. and heaters (not shown) contained in the manifold block 21 were maintained at a temperature of 350° F. These settings of the tank, hose, and gun resulted in the temperature of the liquid molten material throughout the system being maintained at approximately 325° F.

Air pressure from the source 24 for actuation of the pneumatic motor 23 of the applicator 15 and for driving a pneumatic motor 41 for actuating the gear pump 19 was at a pressure of 60 psi. $CO_2$ gas from the gas source 42 was supplied to the gas inlet of the pump 19 at a pressure of 10 psi. In this particular embodiment of the invention a nitrogen gas blanket from a source (not shown) was supplied to the top side of the reservoir 18 to prevent exposure of the molten adhesive contained within the reservoir 18 to oxygen. In the absence of the nitrogen gas blanket over the molten adhesive, there is a tendency of this particular adhesive to degrade because of exposure to oxygen while in the molten state. The nitrogen blanket prevents that exposure.

In this particular, the chuck 35 was rotated at a speed of 900 rpm. The timer control 27 was operative to actuate the solenoid valve and thereby open the valve of the applicator 15 for a duration of 112 milliseconds. This resulted in an applied weight of foamed adhesive material of 230–260 milligrams per lid. The foamed adhesive gasket material partially filled a V-shaped groove 36 in the lid's interior surface. The relative high rotational speed of the lid caused the liquid foam adhesive to flow up the outside edge of the V-shaped groove furthest from the center of the lid. The foamed adhesive material was then cooled by exposure to the atmosphere until such time as the adhesive set up as a solid closed cell adhesive foam. The closed cells of the foam were filled with the carbon dioxide gas which came out of the gas/liquid adhesive solution as the molten material were ejected from the nozzle. The resultant adhesive material had a density of approximately 50% that of the same adhesive applied in an unfoamed condition.

The primary advantage which results from the practice of the invention described hereinabove is that it results in approximately a 50% savings in material cost of adhesive applied to the cap and it results in a more resilient gasket on the cap. The greater resiliency of the adhesive provides a better seal between the cap and any structure to which it is applied, as for example a glass jar.

While we have described only a single preferred system for practicing the method of this invention, numerous different systems could be utilized so long as the system is operative to dispense a foamed adhesive from the nozzle 16. Another suitable apparatus for creating that foam is disclosed in U.S. Pat. No. 4,156,754.

Throughout this application, we have used the phrase "hot melt thermoplastic adhesive". We intend that this phrase shall mean and be limited to a solvent free adhesive which is applied in a molten state and forms a bond upon cooling to a solid state. We have also throughout this specification and in some of the claims utilized the term "solution" to describe the liquid adhesive/gas dispersion supplied under high pressure to the gun or applicator 15, which dispersion when dispensed from the applicator at atmospheric pressure cools and creates a foamed adhesive. We are of the view that the particular apparatus disclosed in the preferred embodiment of apparatus disclosed for practicing this invention does in fact create a true solution in which the molecules of the dissolved gas are dispersed among those of the liquid adhesive. Other apparatus for practicing the invention though do not necessarily create a true solution. The term as used in the specification and claims of the application is intended to define and encompass the broader generic definition of "solution" which is a gas homogeneously mixed with the molten liquid adhesive, whether or not the molecules of the dissolved gas are in fact dispersed among those of the solution.

We do not intend to be limited except by the scope of the following appended claims:

1. The method of obtaining a seal upon the interior surface of a closure for a container, which method comprises heating a thermoplastic adhesive material which is solid at room temperature so as to convert said adhesive material to the molten state, creating a mixture of gas and molten thermoplastic adhesive, pressurizing said mixture of gas and molten thermoplastic adhesive so as to force said gas into solution with said molten thermoplastic adhesive, dispensing the pressurized mixture of gas and molten adhesive at atmospheric pressure onto the interior surface of a container closure, whereby said gas comes out of solution with said molten thermoplastic adhesive and forms a foamed molten adhesive bead upon said interior surface, and cooling said foamed molten adhesive bead while maintained as a foam on said interior surface of said closure so as to form a cellular seal adhered to said interior surface of said closure.

2. Apparatus for creating a seal upon the interior surface of a closure for a container, which apparatus comprises means for heating a thermoplastic adhesive material which is solid at room temperature so as to convert it to the molten state, means for creating a mixture of gas and said molten thermoplastic adhesive, means for pressurizing said mixture of gas and molten thermoplastic adhesive so as to force said gas into solution with said molten thermoplastic adhesive, means for dispensing the pressurized mixture of gas and molten adhesive at atmospheric pressure whereby said gas is released from solution to form a foamed adhesive in an annular pattern on the interior surface of the container closure, and means for maintaining said foamed molten adhesive in said annular pattern on said interior surface while said foam is cooled so as to form a solid cellular seal adhered to said interior surface of said closure.

* * * * *

UNITED STATES PATENT AND TRADEMARK OFFICE
CERTIFICATE OF CORRECTION

PATENT NO. : 4,295,573
DATED : Oct. 20, 1981
INVENTOR(S) : Robert Terry, et al

It is certified that error appears in the above—identified patent and that said Letters Patent is hereby corrected as shown below:

Column 5, line 12, "particular" should be -- application --

Column 5, line 27 "were" should be -- was --

*Signed and Sealed this*

*Twenty-seventh* Day of *April 1982*

|SEAL|

*Attest:*

GERALD J. MOSSINGHOFF

*Attesting Officer*      *Commissioner of Patents and Trademarks*